United States Patent [19]
Forker, Jr. et al.

[11] 3,760,325
[45] Sept. 18, 1973

[54] RESISTIVE DEVICE

[75] Inventors: Ray B. Forker, Jr., Horseheads; William N. Lawless, Corning, both of N.Y.

[73] Assignee: Corning Glass Works, Corning, N.Y.

[22] Filed: Nov. 17, 1972

[21] Appl. No.: 307,463

[52] U.S. Cl.................... 338/262, 117/98, 338/25, 338/225, 338/334
[51] Int. Cl.............................................. H01c 7/02
[58] Field of Search.................... 338/25, 223, 225, 338/258, 262, 334; 117/98

[56] References Cited
UNITED STATES PATENTS
2,717,946  9/1955  Peck .................................. 338/258
2,871,330  1/1959  Colling............................... 338/25 X Primary Examiner—E. A. Goldberg
Attorney—Clarence R. Patty, Jr. et al.

[57] ABSTRACT

A resistive device formed of a porous glass matrix member. Amorphous carbon is formed in situ in an electrically continuous manner within the pores of said matrix member. The member has two terminal ends to which means are electrically connected for making external electrical connection to the device. The resistance of the device is a determinable and measurable function of temperature and the device is useful for measuring temperatures from the cryogenic region to in excess of room temperature since the resistance of the device varies smoothly over such range and the device possesses high sensitivity in such a temperature range.

10 Claims, 4 Drawing Figures

PATENTED SEP 18 1973 3,760,325

RESISTIVE DEVICE

BACKGROUND OF THE INVENTION

1. Field of the Invention

This invention relates to the temperature measuring devices having high sensitivity to temperature changes over the temperature range from cryogenic temperatures to in excess of room temperature. More specifically, the invention relates to a resistive device formed of amorphous carbon impregnated glass.

2. BACKGROUND OF THE INVENTION

The conventional carbon resistance thermometers and doped germanium thermometers have several characteristics that tend to degrade the accuracy of the thermometers or make their use difficult or undesirable. In addition, the resistance derivitive $dR/dT$ of doped germanium thermometers does not vary smoothly and monotonically from 6° K to over 20° K. The resistivity $d \ln R/dT$ of conventional carbon thermometers falls off rapidly above 20° K. Furthermore, doped germanium thermometers, conventional carbon resistance thermometers, or even conventional thermocouples do not permit temperature measurements with high sensitivity between 50° K and 90° K. Heretofore known thermometers suitable for the purposes of the present invention have been found to be quite complicated and expensive to fabricate if their sensitivity and reliability was to be useful for temperature measurements.

SUMMARY OF THE INVENTION

Therefore, it is an object of the present invention to provide an economic device sensitive to temperature changes suitable for use as a resistive temperature measuring device which overcomes all of the aforementioned disadvantages.

Briefly, the present invention comprises a resistive device having a porous glass matrix member with two terminal ends, amorphous carbon formed in situ within the pores of the matrix in an electrically continuous manner, and means electrically connected to the terminal ends for making external electrical connection to the member. The resistance of the device has a determinable and measurable function of temperature. The present invention further contemplates metallizing the terminal ends of the member and attaching thereto electrically conductive leads and thereafter encapsulating the entire unit.

DETAILED DESCRIPTION OF THE INVENTION

Figure 1:
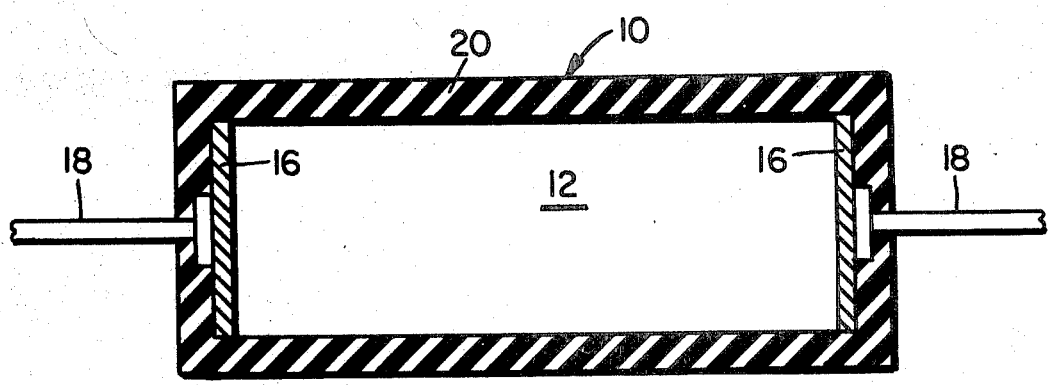
FIG. 1 is an elevational view, partly in section, of the resistive device of the present invention.
Figure 2:
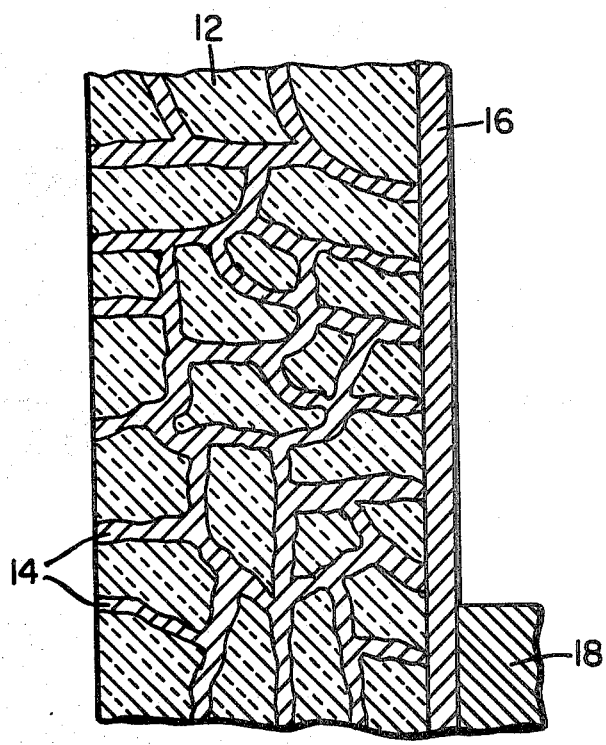
FIG. 2 is a fragmentary enlarged portion of the resistive device of the present invention.

It is to be noted that FIGS. 1 and 2 of the drawings are illustrative and symbolic of the invention, and there is no intention to indicate scale, relative proportions, or materials of the element shown therein.

Referring to FIGS. 1 and 2 there is shown a resistive device 10 comprising a porous glass matrix member 12, within the pores of which carbon filaments 14 have been formed in situ, said carbon filaments being in substantially completely amorphous form. Although the amorphous carbon filaments 14 have been illustrated in FIG. 2 as being solid continuous filaments, they need not be of that nature. It has been found that the elements need only be electrically continuous and may be formed of particulate matter disposed within the pores in a manner so as to be electrically continuous. The amorphous carbon filaments may be formed in situ within the pores by the process described in copending patent application by R. B. Forker, Jr. and J. N. Panzarino, which application is incorporated herein by reference and expressly made part hereof.

After the porous glass matrix is thusly impregnated with amorphous carbon, the terminal ends of member 12 are metallized by application of metal films 16 to the terminal ends of member 12. The thickness of metal films 16 need only be sufficient for the purpose of thereafter attaching suitable element leads 18 to the device. Metal film 16 may be formed of any suitable material such as gold, platinum, silver, aluminum, indium, or the like or may be combinations of various metals such as gold-on-nichrome, aluminum-on-gold, aluminum-on-nichrome, or the like. Leads 18 may be formed of any suitable material such as copper, silver, gold, dumet, or the like.

Leads 18 may be attached to the metal film electrodes 16 on the terminal ends of member 12 by suitable means such as soldering, applying a conductive adhesive such as a silver epoxy, or the like. Thereafter, the unit so formed may be encapsulated by molding a dielectric shell 20 about the unit permitting only the extending portions of leads 18 to extend beyond the molded shell 20. The unit so formed can also be encapsulated by potting within a metallic can, not shown, or by other suitable known encapsulation means.

Glass suitable for forming a porous glass matrix member may be one of the high-silica porous glasses known as 96 percent silica glasses. The manufacture of such glasses is described in detail in the U.S. Pat. No. 2,106,744 to Hood et al., and generally involves the heat treatment of certain phase-separable alkali-borosilicate glasses to form an alkali and boron-rich phase and a silica-rich phase, and subsequent acid leaching of the phase-separated glass to remove the alkali and boron-rich phase. The resulting glass article, which typically comprises at least about 94 percent silica by weight, has a multiplicity of interconnecting microscopic pores resulting from the removal of the soluble phase. It is these pores which may be inpregnated with carbon by the heretofore noted process described in the Forker-Panzarino application.

As a typical example of the present invention, a sheet of such "96 percent silica glass" impregnated with carbon by the Forker-Panzarino process is provided. From the sheet a member approximately 4.8 × 1.6 × 1.0 mm. is cut thereby forming a porous glass matrix member having amorphous carbon filaments therein. Gold-on-nichrome electrodes are then vacuum deposited on the terminal ends of the member. Copper leads of approximately 0.13 mm. in diameter are silver-epoxied to the electrodes and the article so formed is then placed in a vacuum oven and baked at 100° C for 24 hours to remove any adsorped water and gases. The unit is then sealed within a Teflon-lined platinum can with a dielectric epoxy in a helium atmosphere. A suitable epoxy for such purposes is Torr-Seal epoxy manufactured by Varian Inc. of Palo Alto, California. Other dielectric encapsulating materials that are thermally and chemically compatible with the other parts of the device and which are thermally stable at operating temperatures may also be used for sealing or encapsulation. A suitable silver epoxy for attaching the leads to the metal electrodes is epoxy solder number 3021 manufactured by Epoxy Products Company of New Haven, Connecticut. As will be understood, other electrically conductive adhesive materials that are thermally and chemically compatible with the other parts of the device during use and application thereof, and which are thermally stable at operating temperatures, may also be used for attaching the leads.

Figure 3:
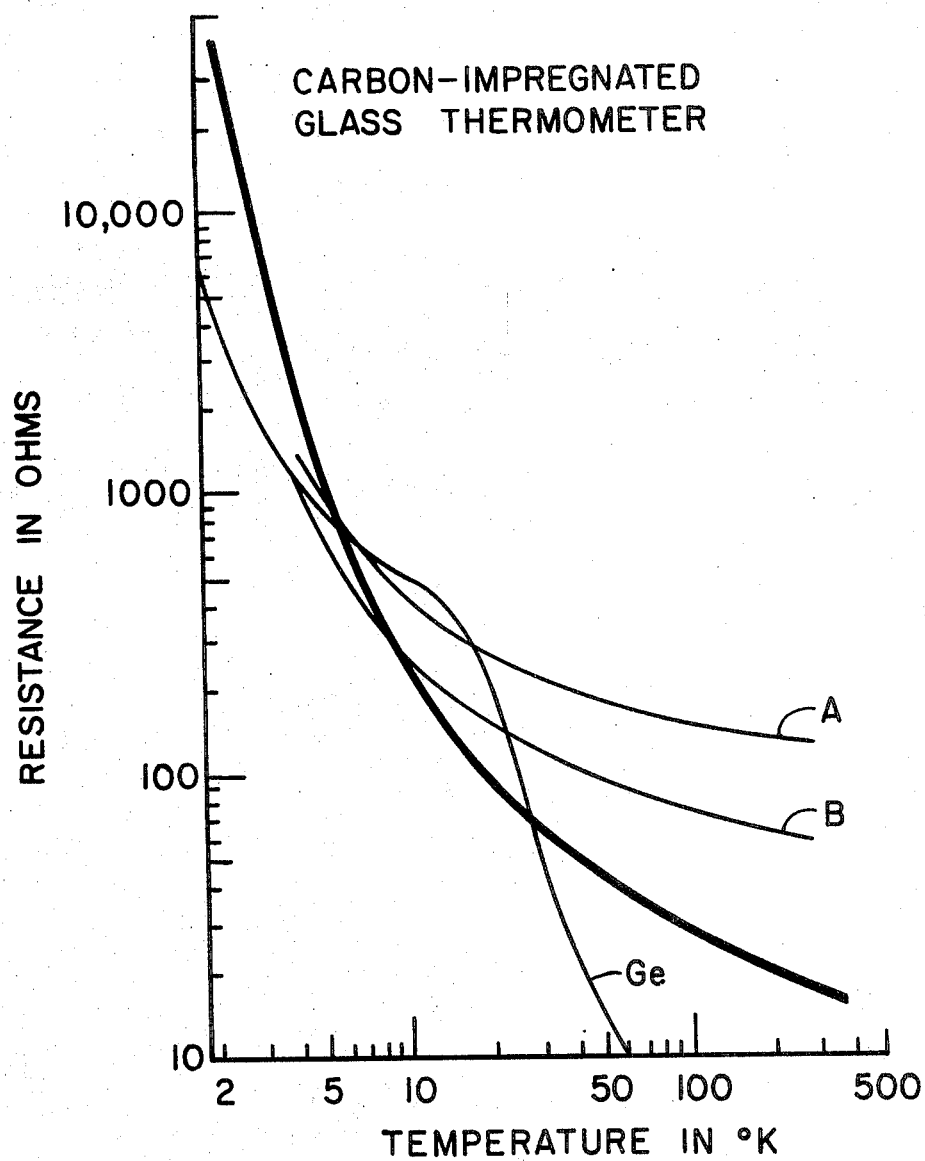
FIG. 3 is a graph of temperature v. resistance of the resistive device of the present invention and other devices.
Figure 4:
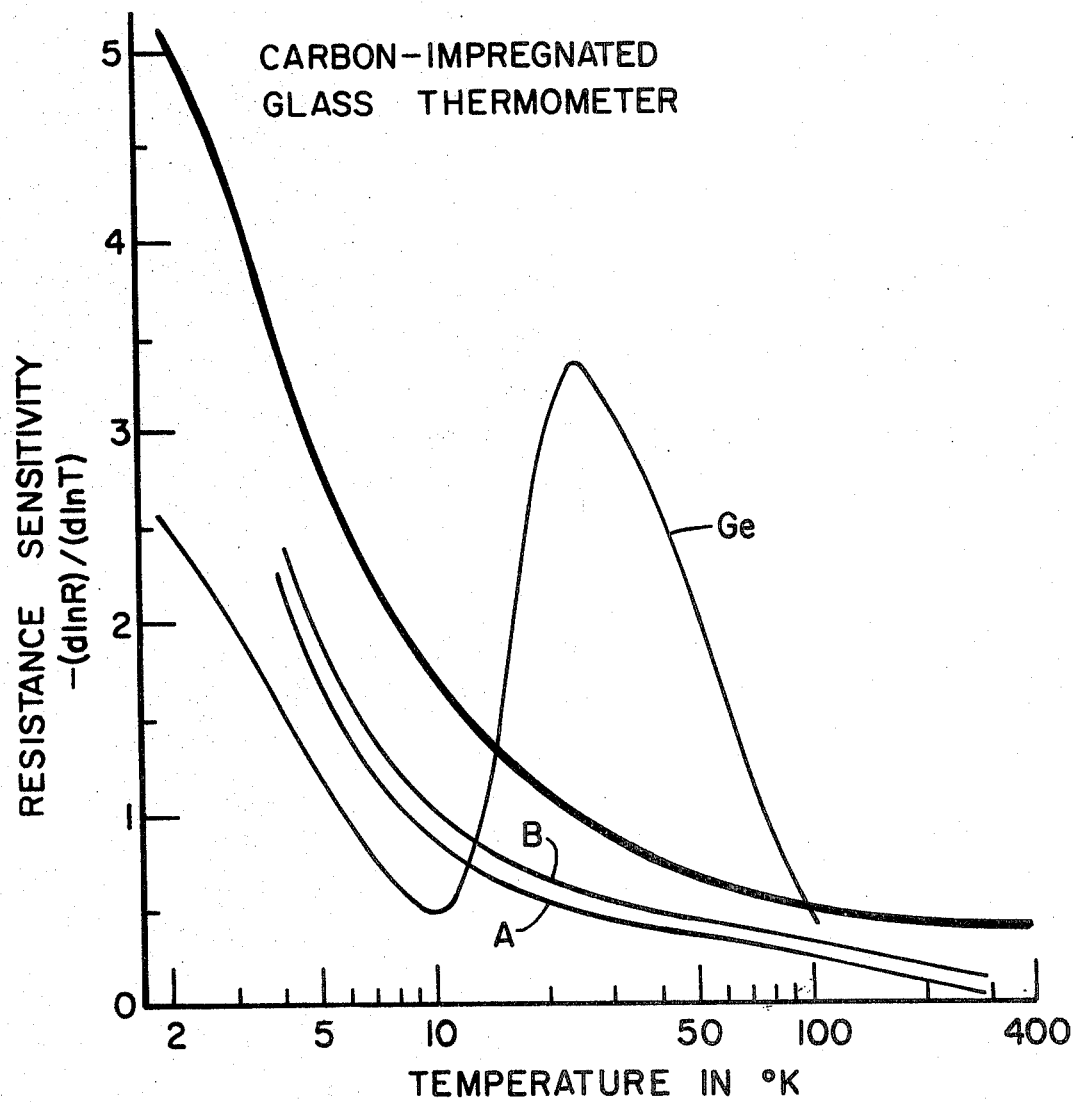
FIG. 4 is a graph of the resistance sensitivity v. temperature of the resistive device of the present invention and other devices.

The device so formed was placed in a cryostat and the resistance was measured between approximately 2° K and 400° K. Measurements were made on both cooling and heating below 77° K and on heating above 77° K. An exciting current of $1 \mu A$ was used below 4.2° K, $10 \mu A$ to 10° K, $20 \mu A$ to 50° K, and $100 \mu A$ to 400°K. Typical resistance-temperature data are shown in FIG. 3. For comparison, there is also shown in FIG. 3 data measured under similar conditions for a commercial doped germanium thermometer designated by the curve marked Ge and for two commercial carbon resistors, the curves of which are marked A and B. These data show that the resistance vs. temperature relationship is smooth and monotonic from 2° K to 400° K for the carbon impregnated glass thermometer. It is seen from FIG. 3 that resistance does not increase as rapidly with decreasing temperature below 4.2° K as it does for both the doped germanium and conventional carbon resistance thermometers, thus indicating that the range of said thermometer can probably be extended substantially below 1.5° K. For further comparison of the various thermometers, resistance sensitivities $dlnR/dlnT$ were derived from the resistance temperature data of FIG. 3, and these data are shown in FIG. 4 for the temperature range of 2° K to 400° K. The well-known oscillation in the $dlnR/dlnT$ for doped germanium thermometers is evident in FIG. 4 which makes these thermometers tedious to "curve fit"; that is, the resistance-temperature behavior of these thermometers can only be described by complicated mathematical equations. The $dlnR/dlnT$ data for carbon impregnated porous glass thermometers are about twice as large over the entire temperature range as that of the commercial carbon resistors.

It is further to be noted that $dlnR/dlnT \geq 0.4$ from 77° K to 400° K for the carbon impregnated glass thermometer so that a 0.4 percent resistance measurement would correspond to a temperature resolution $\leq 1$ percent in this temperature range.

As will be understood, the resistance derivative $dR/dT$ varies smoothly and monotonically from 6° K to 20° K for the present carbon impregnated glass thermometers in contrast to the known doped germanium thermometers. The resistivity $dlnR/dT$ does not fall off rapidly above 20° K in contrast to the conventional carbon thermometers. The present carbon impregnated glass thermometer covers the range of 50° K to 90° K with high sensitivity, which range is not covered by the doped germania or conventional carbon thermometers, or for that matter by conventional thermocouples.

It has been found that the carbon glass resistive device of the present invention provides a vastly improved thermometer over that heretofore available and one which is simpler to fabricate and more economical than the heretofore known doped germanium thermometer. The present resistive device also provides much improved performance over both the doped germanium thermometers as well as the commercial carbon resistor thermometers.

Although the present invention has been described with respect to specific details of certain embodiments thereof, it is not intended that such details be limitations upon the scope of the invention except insofar as set forth in the following claims.

We claim:

1. A resistive device comprising
   a porous glass matrix member having two terminal ends,
   carbon in substantially completely amorphous condition formed in situ within the pores of said matrix in an electrically continuous manner, and
   means electrically connected to said terminal ends for making external electrical connection to said member, the resistance of said device being a determinable and measurable function of temperature.

2. The resistive device of claim 1 wherein said means are wire leads.

3. The resistive device of claim 2 further comprising a means for encapsulating said device such that only said wire leads extend beyond the encapsulant.

4. The resistive device of claim 1 further comprising a metallic film electrode formed on each of said terminal ends.

5. The resistive device of claim 4 further comprising a wire lead electrically connected to each of said metal film electrodes.

6. The resistive device of claim 5 wherein said metal film electrode is formed of nichrome-gold material.

7. The resistive device of claim 6 wherein the porous glass matrix member is formed of a phase-separable alkali-borosilicate glass.

8. The resistive device of claim 7 wherein the amorphous carbon is formed in particulate form, said particles being disposed in a continuous and electrically continuous manner.

9. The resistive device of claim 8 further comprising a means for encapsulating said device such that only said wire leads extend beyond the encapsulant.

10. The resistive device of claim 1 wherein the amorphous carbon is formed in particulate form, said particles being disposed in a contiguous and electrically continuous manner.

* * * * *